(12) United States Patent
Flagstad et al.

(10) Patent No.: US 6,929,270 B1
(45) Date of Patent: Aug. 16, 2005

(54) APPLIANCE PLATFORM APPARATUS

(76) Inventors: Karsten S. Flagstad, 3200 229th Ave., Bethel, MN (US) 55005; Jordan S. Flagstad, 3200 229th Ave., Bethel, MN (US) 55005

( * ) Notice: Subject to any disclaimer, the term of this patent is extended or adjusted under 35 U.S.C. 154(b) by 108 days.

(21) Appl. No.: 10/384,143

(22) Filed: Mar. 10, 2003

(51) Int. Cl.$^7$ ............................................... B62B 1/00
(52) U.S. Cl. .................................................. 280/79.11
(58) Field of Search .................... 280/79.1, 79.2, 280/35, 38, 651, 43; D34/23

(56) References Cited

U.S. PATENT DOCUMENTS

| | | |
|---|---|---|
| 2,695,147 A | 11/1954 | Castricone |
| D248,845 S * | 8/1978 | White et al. ................. D34/17 |
| D303,029 S * | 8/1989 | Friskey ........................ D34/23 |
| 4,967,994 A | 11/1990 | Rice |
| 5,184,653 A * | 2/1993 | Lacy ............................ 141/98 |
| 5,199,122 A | 4/1993 | Styblo |
| 5,310,146 A | 5/1994 | Maguire |
| 5,785,293 A | 7/1998 | Ford et al. |
| 6,386,560 B2 * | 5/2002 | Calender ................. 280/47.34 |

FOREIGN PATENT DOCUMENTS

JP            11-227611        *   9/1999

* cited by examiner

*Primary Examiner*—Bryan Fischmann

(57) ABSTRACT

An appliance platform apparatus for holding and moving an appliance includes a housing having an upper wall and a peripheral wall that is attached to and extends downward from the upper wall. The upper wall has a depression therein. The upper wall has an aperture extending therethrough which defines a drain hole. The drain hole is positioned in the depression. A wheel assembly is attached to the housing for selective movement of the housing. An appliance may be positioned on the housing.

13 Claims, 3 Drawing Sheets

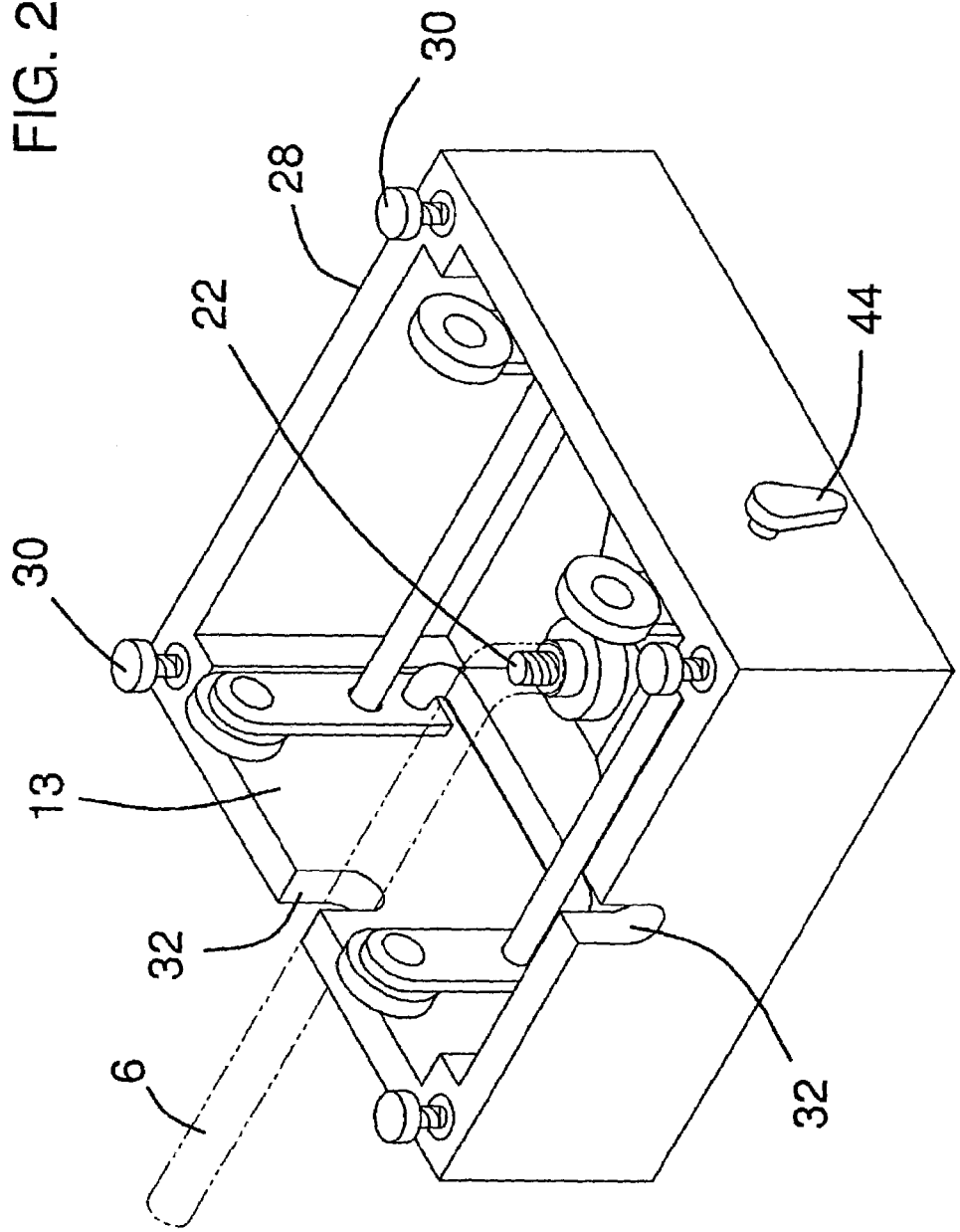

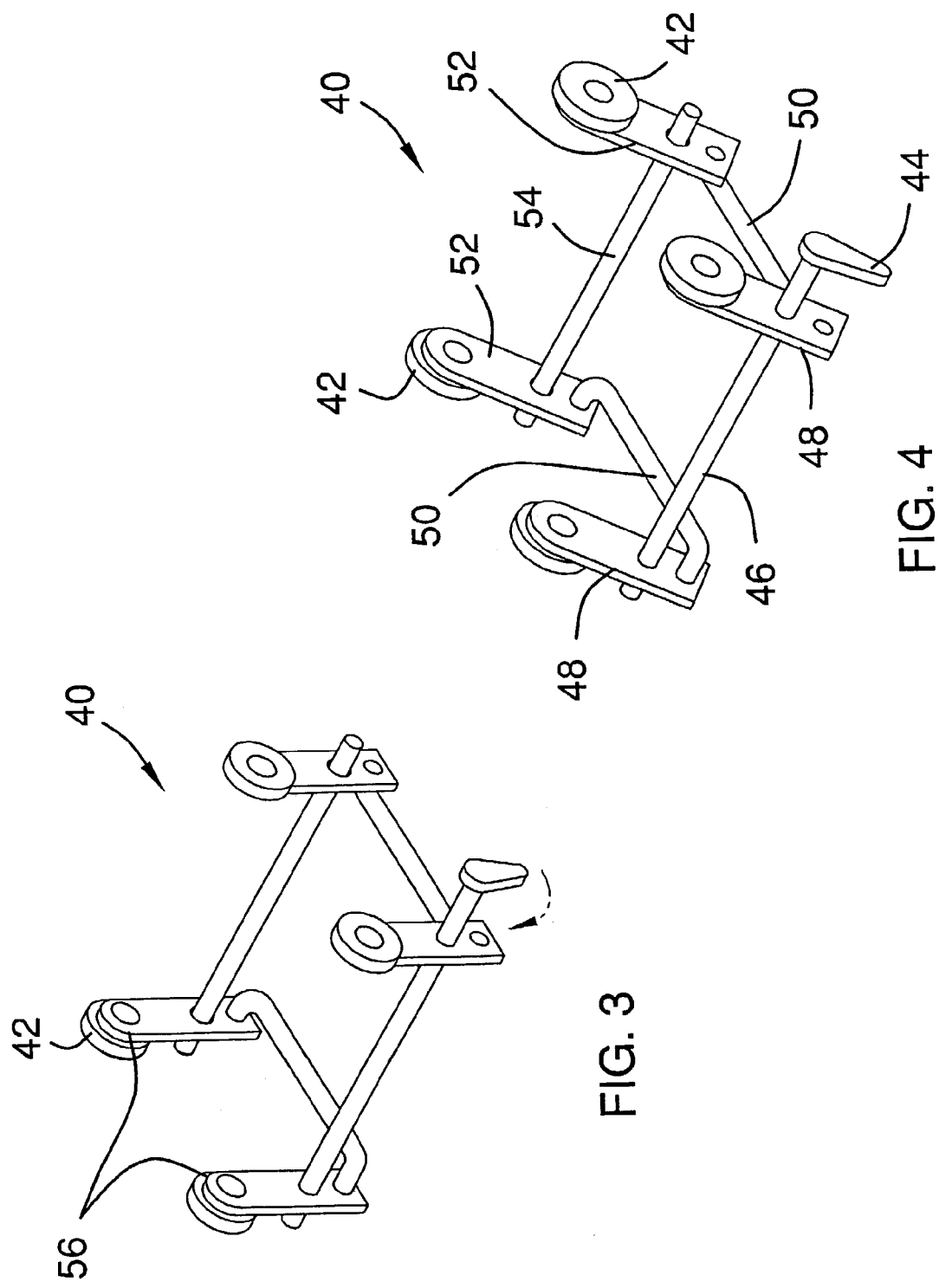

APPLIANCE PLATFORM APPARATUS

BACKGROUND OF THE INVENTION

1. Field of the Invention

The present invention relates to appliance stands and more particularly pertains to a new appliance stand for PURPOSE.

2. Description of the Prior Art

The use of appliance stands is known in the prior art. U.S. Pat. No. 4,967,994 describes a device for leveling an appliance. Another device similar to appliance stands is U.S. Pat. No. 5,785,293 which includes a base having wheels thereon for holding and moving machinery.

While these devices fulfill their respective, particular objectives and requirements, the need remains for a device that includes a drainage system for appliances which utilize water in their function.

SUMMARY OF THE INVENTION

The present invention meets the needs presented above by including a housing on top of which an appliance may be rested and which has an upper wall having a drain hole therein.

Another object of the present invention is to provide a new appliance stand that has legs which have a selective height for the leveling of the housing, and, thereby, the leveling of the appliance.

Still another object of the present invention is to provide a new appliance stand that includes a wheel assembly for the easy movement of the appliance for repairs or a location change.

To this end, the present invention generally comprises a housing having an upper wall and a peripheral wall that is attached to and extends downward from the upper wall. The upper wall has a depression therein. The upper wall has an aperture extending therethrough which defines a drain hole. The drain hole is positioned in the depression. A wheel assembly is attached to the housing for selective movement of the housing. An appliance may be positioned on the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic inverted perspective view of the present invention.

FIG. 3 is a schematic inverted perspective view of the wheel assembly of the present invention in a first position.

FIG. 4 is a schematic inverted perspective view of the wheel assembly of the present invention in a second position.

DESCRIPTION OF THE PREFERRED EMBODIMENT

Figure 1:
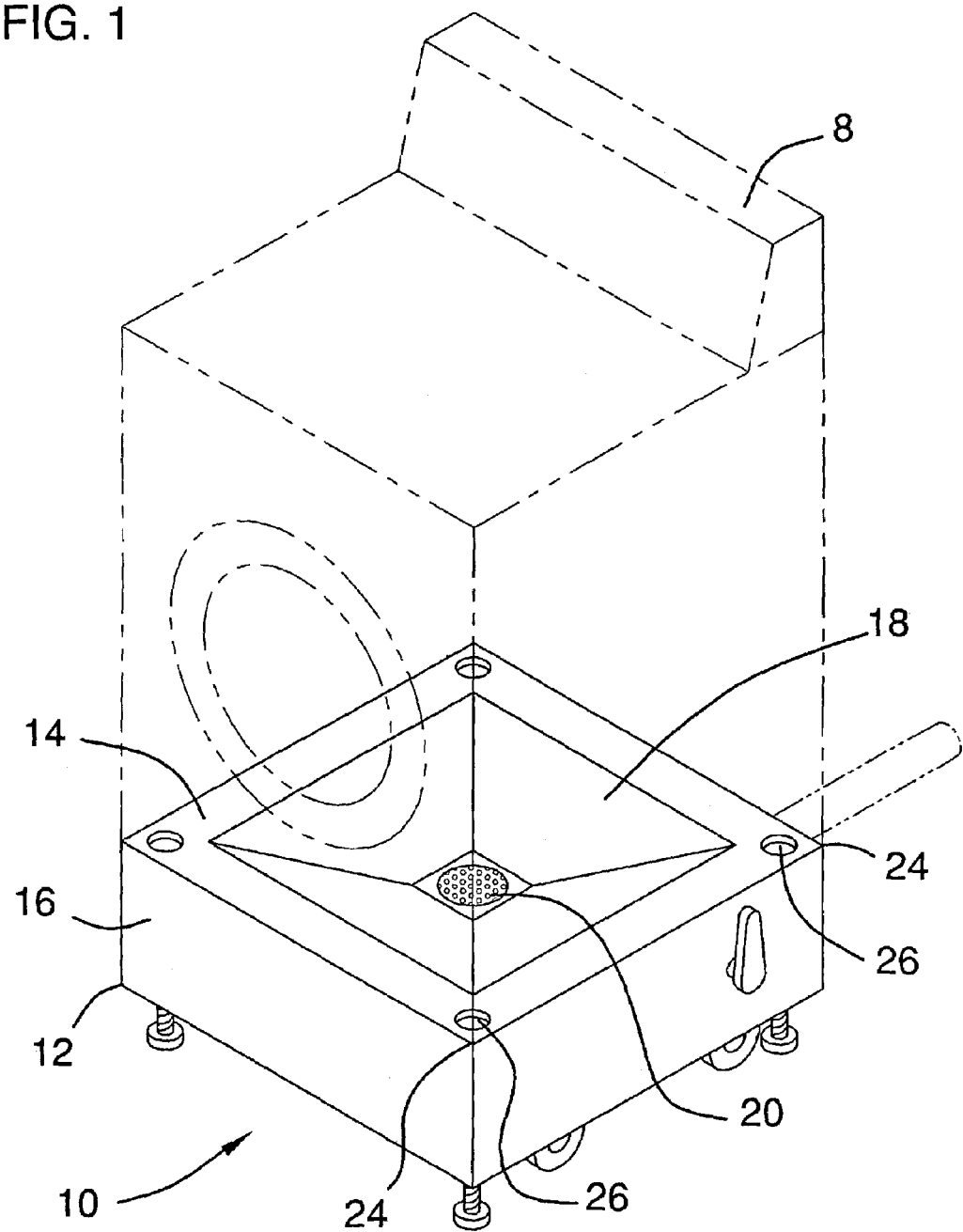
FIG. 1 is a schematic perspective view of an appliance platform apparatus according to the present invention.

With reference now to the drawings, and in particular to FIGS. 1 through 4 thereof, a new appliance stand embodying the principles and concepts of the present invention and generally designated by the reference numeral 10 will be described.

As best illustrated in FIGS. 1 through 4, the appliance platform apparatus 10 generally comprises a housing 12 having an upper wall 14 and a peripheral wall 16 that is attached to and extends downward from the upper wall 14. The upper wall 14 has a depression therein 18. The upper wall 14 has an aperture 20 extending therethrough. The aperture 20 defines a drain hole which is positioned in the depression. A drain conduit 22 is fluidly coupled to the drain hole, or aperture 20, and extends downward therefrom. The upper wall 14 has a generally rectangular shape such that four corners 24 are defined. The upper wall 12 has four indents 26 therein. Each of the indents 26 is positioned generally adjacent to one of the corners 24.

The peripheral wall 16 has a bottom edge 28. Each of a plurality of legs 30 is attached to and extends downward from the bottom edge 28. Preferably, each of the plurality of legs 30 is removably extendable into the bottom edge 28 such that an effective height of each of the legs 30 may be selectively determined. The height of the legs 30 is independent of each other so that the legs 30 may be used for leveling the housing and an appliance 8 positioned thereon. Preferably, the bottom edge 28 has at least one slot 32 therein extending upwardly toward the upper wall 14. The slot 32 aids the user of the apparatus 10 so that a drain pipe 6 may be fluidly coupled to the drain conduit 22 and extended outwardly away from the housing 12 through the at least one slot 32. Additional slots 32 may be added to ensure that the drain conduit 22 is easily accessible by the drain pipe 6.

A wheel assembly 40 is attached to an inner surface 13 of the housing 12. The wheel assembly 40 includes a plurality of wheels 42 that extend below a plane of the bottom edge 28 for selective movement of the housing 12 along a planar surface. The wheels 42 are selectively positioned between a retracted position inward of the housing 12 and an extended position outward of the housing 12. This may be accomplished in any number of methods, one of which is shown in FIGS. 2 through 4 and includes a wheel lift lever 44 fixedly attached to a first pivot shaft 46. The first pivot shaft 46 extends through the peripheral wall 16 on opposite sides of the housing 12. The first pivot shaft 46 is attached to a first pair of plates 48. A pair of pivot links 50 pivotally couples the first pair of plates 48 to a second pair of plates 52. A second pivot shaft 54 is attached to each of the second pair of plates 52 and also extends into opposite sides of the peripheral wall 16. The plurality of wheels 42 is attached to the first 48 and second 52 pair of plates. When the wheel lift lever 44 is moved, free ends 56 of the plates 48, 52 move more inward of, or outward of, the housing 12 with respect to an opening defined by the bottom edge 28 of the peripheral wall 16.

In use, an appliance 8 may be positioned on the housing 12 so that feet of the appliance 8 may be positioned in the indents 26. The wheels 42 aid the moving of the appliance 8. When the appliance 8 is in its desired location, the wheels 8 are retracted inward of the housing 12 so that the housing 12 rests on the legs 30. If the appliance 8 is one that utilizes water in its function, such as a clothes washer, a drain pipe 6 may be attached to the drain conduit 22 to drain away any spillage from the appliance 8 in case of malfunction or during repair.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claimed:

1. An appliance dolly apparatus comprising:

a housing having an upper wall and a peripheral wall being attached to and extending downward from said upper wall, said upper wall having a depression therein, said upper wall having an aperture extending therethrough, said aperture defining a drain hole, said drain hole being positioned in said depression, said peripheral wall has a bottom edge said bottom edge having at least one slot therein extending upwardly toward said upper wall, wherein a drain pipe may be fluidly coupled to said drain conduit and extended outwardly away from said housing through said at least one slot;

a wheel assembly being attached to said housing for selective movement of said housing; and wherein an appliance may be positioned on said housing.

2. The appliance dolly apparatus of claim 1, further including a drain conduit being fluidly coupled to said drain hole and extending downward therefrom.

3. The appliance dolly apparatus of claim 1, wherein said upper wall has a generally rectangular shape such that four corners arc defined, said upper wall having four indents therein, each of said indents being positioned generally adjacent to one of said corners, wherein feet of the appliance may be positioned in said indents.

4. The appliance dolly apparatus of claim 1, wherein said peripheral wall has a bottom edge, each of a plurality of legs being attached to said bottom edge.

5. The appliance dolly apparatus of claim 4, wherein each of said legs is removably extendable into said bottom edge such that an effective height of each of said legs may be selectively determined.

6. The appliance dolly apparatus of claim 1, wherein said wheel assembly is attached to an interior of said housing and includes a plurality of wheels extending below a plane defined by a bottom edge of said peripheral wall.

7. The appliance dolly apparatus of claim 6, wherein said plurality of wheels is selectively positioned between a retracted position inward or said housing and an extended position outward of said housing.

8. An appliance dolly apparatus comprising:

a housing having an upper wall and a peripheral wall being attached to and extending downward from said upper wall, said upper wall having a depression therein, said upper wall having an aperture extending therethrough, said aperture defining a drain hole, said drain hole being positioned in said depression, a drain conduit being fluidly coupled to said drain hole and extending downward therefrom, said upper wall having a generally rectangular shape such that four corners are defined, said upper wall having four indents therein, each of said indents being positioned generally adjacent to one of said corners, said peripheral wall having a bottom edge, each of a plurality of legs being removably extendable into said bottom edge such that an effective height of each of said legs may be selectively determined, said bottom edge having at least one slot therein extending upwardly toward said upper wall, wherein a drain pipe may be fluidly coupled to said drain conduit and extended outwardly away from said housing through said at least one slot;

a wheel assembly being attached to an inner surface of said housing, said wheel assembly including a plurality of wheels being selectively positioned between a retracted position inward of said housing and an extended position outward of said housing; and wherein an appliance may be positioned on said housing wherein feet of the appliance may be positioned in said indents.

9. An appliance dolly apparatus comprising:

a housing having an upper wall and a peripheral wall being attached to and extending downward from said upper wall, said upper wall having a depression therein, said upper wall having an aperture extending therethrough, said aperture defining a drain hole, said drain hole being positioned in said depression, said peripheral wall has a bottom edge;

each or a plurality of legs being attached to said bottom edge, each of said legs is removably extendable into said bottom edge such that an effective height of each of said legs may be selectively determined;

a wheel assembly being attached to said housing for selective movement of said housing; and wherein an appliance may be positioned on said housing.

10. The appliance dolly apparatus of claim 9, further including a drain conduit being fluidly coupled to said drain hole and extending downward therefrom.

11. The appliance dolly apparatus of claim 9, wherein said upper wall has a generally rectangular shape such that four corners are defined, said upper wall having four indents therein, each of said indents being positioned generally adjacent to one of said corners, wherein feet of the appliance may be positioned in said indents.

12. The appliance dolly apparatus of claim 9, wherein said wheel assembly is attached to an interior of said housing and includes a plurality of wheels extending below a plane defined by a bottom edge of said peripheral wall.

13. The appliance dolly apparatus of claim 12, wherein said plurality of wheels is selectively positioned between a retracted position inward of said housing and an extended position outward of said housing.

* * * * *